(12) United States Patent
Tanaka et al.

(10) Patent No.: US 7,350,140 B2
(45) Date of Patent: Mar. 25, 2008

(54) USER-DATA RELATING APPARATUS WITH RESPECT TO CONTINUOUS DATA

(75) Inventors: Kei Tanaka, Kanagawa (JP); Shingo Uchihashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 945 days.

(21) Appl. No.: 10/659,307

(22) Filed: Sep. 11, 2003

(65) Prior Publication Data

US 2005/0005016 A1  Jan. 6, 2005

(30) Foreign Application Priority Data

Mar. 13, 2003  (JP) .............................. 2003-067494

(51) Int. Cl.
*G06F 15/00* (2006.01)
(52) U.S. Cl. .................... 715/512; 715/500.1
(58) Field of Classification Search ................ 715/500, 715/500.1, 722, 723, 512, 501.1
See application file for complete search history.

(56) References Cited

U.S. PATENT DOCUMENTS

| | | | |
|---|---|---|---|
| 6,493,872 B1* | 12/2002 | Rangan et al. ................. 725/32 |
| 6,842,190 B1* | 1/2005 | Lord et al. ................. 348/231.5 |
| 7,051,271 B1* | 5/2006 | Chiu et al. ................. 715/500.1 |
| 2001/0014210 A1* | 8/2001 | Kang ........................... 386/96 |
| 2001/0023436 A1* | 9/2001 | Srinivasan et al. .......... 709/219 |
| 2002/0027976 A1* | 3/2002 | Wilcox et al. ............. 379/67.1 |
| 2003/0124502 A1* | 7/2003 | Chou .......................... 434/350 |
| 2003/0140159 A1* | 7/2003 | Campbell et al. ........... 709/231 |
| 2004/0021685 A1* | 2/2004 | Denoue et al. .............. 345/721 |
| 2004/0034869 A1* | 2/2004 | Wallace et al. ................ 725/45 |
| 2004/0216173 A1* | 10/2004 | Horoszowski et al. ...... 725/145 |
| 2004/0221227 A1* | 11/2004 | Wu ............................. 715/512 |
| 2004/0221323 A1* | 11/2004 | Watt ............................. 725/135 |

(Continued)

FOREIGN PATENT DOCUMENTS

JP        A 9-171448        6/1997

(Continued)

OTHER PUBLICATIONS

Costa et al., Annotation as Multiple Perspectives of Video Content, ACM 2002, pp. 283-286.*

(Continued)

*Primary Examiner*—Cong-Lac Huynh
(74) *Attorney, Agent, or Firm*—Oliff & Berridge, PLC

(57) ABSTRACT

In a meeting held with employment of a plurality of materials, conditions of this meeting are recorded in the form of continuous data, and these materials are distributed to a user P who participates in this meeting by way of a printed matter and/or a screen output. Then, an analyzing unit analyzes the recorded continuous data so as to specify both a material and a place of the continuous data where this material was used. Also, an annotation/material relating unit specifies both an annotation which was added to a distributed material by the user in the meeting and this distributed material. A material matching unit judges a matching characteristic between these specified material and distributed materials. Then, are relating unit links the place of the continuous data where the material having the matching characteristic was employed with respect to the annotation of the distributed material.

9 Claims, 2 Drawing Sheets

U.S. PATENT DOCUMENTS

| | | | |
|---|---|---|---|
| 2006/0008152 A1* | 1/2006 | Kumar et al. | 382/190 |
| 2006/0140592 A1* | 6/2006 | Kang | 386/111 |
| 2006/0143559 A1* | 6/2006 | Spielberg et al. | 715/512 |
| 2006/0143567 A1* | 6/2006 | Chiu et al. | 715/720 |
| 2007/0038935 A1* | 2/2007 | Hull et al. | 715/706 |
| 2007/0118794 A1* | 5/2007 | Hollander et al. | 715/512 |

FOREIGN PATENT DOCUMENTS

| | | |
|---|---|---|
| JP | A 2001-350394 | 12/2001 |
| JP | A 2002-57981 | 2/2002 |
| JP | A 2002-162208 | 6/2002 |

OTHER PUBLICATIONS

Sastry et al., Webtour: A System to Record and Playback Dynamic Multimedia Annotations on Web Document Content, ACM 1999, pp. 175-178.*

Hurst et al., A Synchronization Model for Recorded Presentations and its Relevance for Information Retrieval, ACM 1999, pp. 333-342.*

Chiu et al., LiteMinutes : An Internet-Based System for Multimedia Meeting Minutes, ACM 2001, pp. 140-149.*

Girgensohn, Andreas et al. "Facilitating Video Access by Visualizing Automatic Analysis" *In Human-Computer Interaction* 1999, IOS. Press, pp. 205-212, 1999.

Chen, Chu-Song, et al., "Range Data Acquisition Using Color Structured Lighting and Stereo Vision," 1997, *Image and Vision Computing*, 15, pp. 445-456.

"Card Gear," Jan. 11, 2000, pp. 8, Website: <http://www.fujixerox.co.jp/soft/cardgear/>.

* cited by examiner

| CONTINUOUS DATA NO. | ACTUAL DATA |
|---|---|
| ⋮ | ⋮ |

| CONTINUOUS DATA NO. | MATERIAL NO. | POSITION |
|---|---|---|
| ⋮ | ⋮ | ⋮ |

| ANNOTATION NO. | ACTUAL DATA |
|---|---|
| ⋮ | ⋮ |

| MATERIAL NO. | ANNOTATION NO. | MATERIAL ACTUAL DATA |
|---|---|---|
| ⋮ | ⋮ | ⋮ |

| CONTINUOUS DATA NO. | LINK (POSITION-ANNOTATION NO.) |
|---|---|
| ⋮ | ⋮ |

USER-DATA RELATING APPARATUS WITH RESPECT TO CONTINUOUS DATA

BACKGROUND OF THE INVENTION

1. Field of the Invention

The present invention is related to a technique by which a user causes user data such as an annotation to be related to continuous data, e.g., video data and voice data. More specifically, the present invention is directed to a user data relating technique by which this user-data relating operation is carried out based upon materials employed while the continuous data is acquired.

2. Description of the Related Art

Continuous data such as video and speech have been utilized in various fields of daily life. For instance, contents of meetings, presentations, public performances, and lectures are recorded in the form of continuous data, and thereafter, are reused so as to be confirmed.

While such continuous data are recorded, there are many cases that explanations are made by employing materials such as documents and images, and such materials are close related to certain scenes and contents contained in these continuous data.

Also, in such a case that these continuous data are recorded, there are many possibilities that users as participants make such annotations as comment memorandums in accordance with contents thereof. Such annotations may have higher use values as a sign capable of seeking a desirable contents portion and a chance capable of confirming an important aspect.

The below-mentioned technical ideas capable of processing relative information between such annotations and materials are known in this field.

In a so-called "knowledge-Drive" system, such a relative data is prepared in that both video data in which a lecture and a public performance have been previously recorded, and also, materials used in this video data may be reproduced in a synchronous manner. Then, a user functioning as a listener temporarily stops reproducing operation of the video data, and may write a comment with respect to a material under use in a notice board form. Also, thereafter, the user may specify from a comment, such as material to which this comment has been made, and furthermore, may access a video data portion which is probably related to this comment by employing relative data which has been previously prepared.

Also, another technical idea is known. That is, while a meeting is recorded, event information which can be acquired by using various sorts of apparatus within this meeting is caused to be mutually related to video data. Thereafter, when the recorded video data is reproduced, a target position contained in the recorded video data may be specified in a simple manner, as disclosed in JP-A-9-171448.

Another technical idea is known. That is, an electronically-readable identifier is applied to such an annotation given by digital ink while recorded video data is reproduced, and since this annotation is printed out, a link may be established between this annotation and the video data, as disclosed in JP-A-2002-57981.

In a so-called "Card Gear" system, since a plurality of bar codes given to papers are utilized, links as to materials printed on the papers and electronic presentation materials are produced, and these printed materials/electronic presentation materials may be utilized based upon a link relationship.

Further, in a so-called "Meta data Player" system, such an interface may be provided. That is, while video data is analyzed, both a time instant when a presentation material is displayed and a time instant when a camera switching operation is carried out may be quickly viewed in a simple manner by employing this analysis result of the video data.

Such trials have been carried out many times. In these trails, indexes utilizing such annotations as texts, voice (speech), and free-form ink have been formed with respect to continuous data such as video pictures and voice produced by recording a meeting and a conference. In these conventional trails, such indexing operations have been carried out in correspondence with reproduced positions (time information) of video pictures and time information as to when annotations are produced.

In this case, considering actual meetings and actual conferences, these meetings/conferences have been usually carried out in such a mode that materials to be announced have been previously distributed to participants. In such a material distribution mode, the following opportunities maybe some times observed. That is, the participants read through such a material in which these participants have interests and then annotate with respect to this interesting material irrespective of a content which is actually announced by a speaker.

In the case that such a mode is recorded, if the annotation is caused to be related to the continuous data by utilizing the time information, then such a link is produced with respect to an actually no-relevant portion as to the participants. As a result, even when the participants utilize these links when the continuous data is reproduced, these annotations do not give any merits.

SUMMARY OF THE INVENTION

The present invention has been made to solve the conventional problem, and therefore, has an object. That is, a relating operation between continuous data and static user data such as an annotation related to this continuous data is carried out in connection with an actual activity of a user.

Further objects of the present invention may become apparent from the below-mentioned explanations.

As previously explained, in a meeting, or the like, participants simply view distributed materials, and write comment memorandums into contents of such materials in which these participants have interest irrespective of a progress of an explanation.

Therefore, according to the present invention, relating process operation may be realized in connection with such an actual case. That is, in a meeting progressed in such a way that materials are distributed to users under such a mode that these materials have been printed on papers, or have been displayed on personal computers handled by these users, such user data as annotations are given to these distributed materials rather than explanations made by speakers.

The present invention maybe realized by way of a user-data relating apparatus, a program capable of realizing this user-data relating apparatus by a computer, and also, a user-data relating method executed by utilizing an information processing technique. Thus, user data to be added by a user in relation to a material employed when continuous data such as meeting pictures is recorded may be caused to be related to a predetermined position of this continuous data.

Concretely speaking, in accordance with the present invention, user data is inputted which is added by a user in relation to a material, and then, the user data is caused to be related to a position contained in the continuous data in which this material was employed based upon a corresponding relationship between the material related to the user data and materials employed when the continuous data is recorded.

In such a case that a relationship between the material employed when the continuous data is recorded and the position contained in the continuous data in which this material was employed has not previously been specified, these relationship may be specified by employing, for example, the method disclosed in the non-patent publication 3 in accordance with the present invention.

As to such a material that a distributed material has been printed on a paper, in such a case that a user adds user data such as a comment to this material, in accordance with the present invention, while this material is read by such an image reading apparatus as a scanner, the user data is extracted from the read material image data by comparing, for example, the material to which the user data has been added with an original material. Then, as explained above, the extracted user data maybe related to a position contained in the continuous data in which the corresponding material was employed.

Also, in accordance with the present invention, both the continuous data and the user data may be reproduced in a synchronous manner based upon the acquired relating information so as to provide the relevant continuous data to the user.

It should be noted that the inventive idea of the present invention maybe applied to continuous data produced from images, voice, and combinations between these images and voice. The user data may be entered in various sorts of formats, not only a text description, but also images and voice.

As a consequence, in accordance with the present invention, for example, irrespect of a progress condition of a public performance, an annotation described in a distributed material may be caused to be related to a proper position of video data by employing a mutual link. Also, in the conventional technique, the relationship between the video data and the materials must be previously described. To the contrary, in accordance with the present invention, the specifying operation of the relationship between these items and the relating operation by using the link may be carried out in a post processing operation. Furthermore, in accordance with the present invention, such an annotation which has been attached to a material of such a medium as paper (namely, not electronic information) may be caused to be related to video data.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

User-data relating apparatus of the present invention will now be described in a concrete manner based upon an embodiment.

Figure 1:
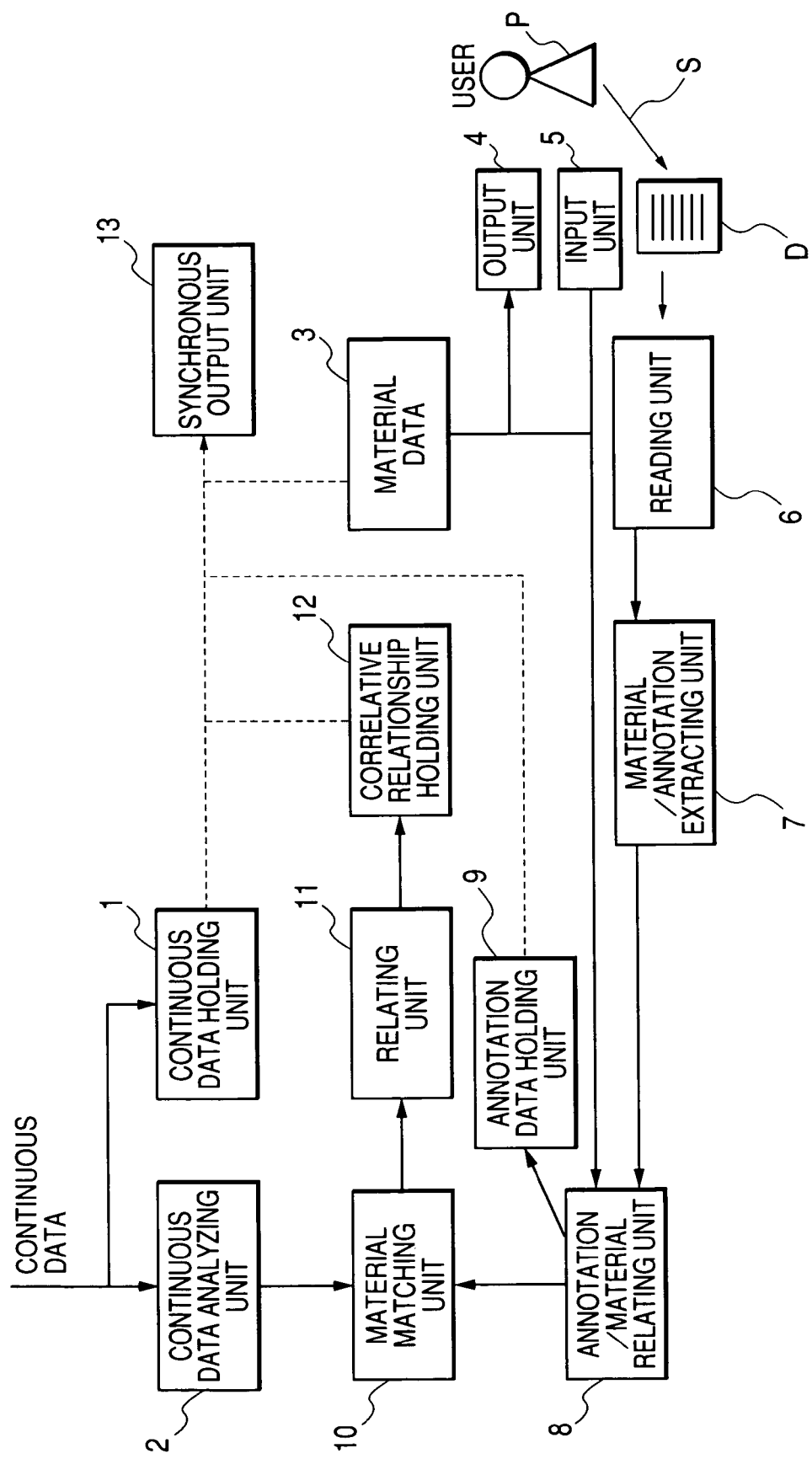
FIG. 1 is a diagram for indicating an arrangement of a user-data relating apparatus according to an embodiment of the present invention.

FIG. 1 schematically shows an arrangement of a user-data relating apparatus according to an embodiment of the present invention. In this example, an annotation which is described by a user "P" as user data is related to continuous data as video data containing voice data.

The user-data relating apparatus of this example contains a continuous data holding unit 1, a continuous data analyzing unit 2, a material data supplying unit 3, an output unit 4, an input unit 5, a reading unit 6, a material/annotation extracting unit 7, an annotation/material relating unit 8, an annotation data holding unit 9, a material matching unit 10, a relating unit 11, a correlative relationship holding unit 12, and a synchronous output unit 13.

These functional units may be arranged as dedicated apparatus. However, in this embodiment, the functional units for executing process operations according to the present invention are realized by executing a process program according to the present invention by a computer.

The continuous data holding unit 1 is constructed of a readable/writable memory, and holds the continuous data (video data).

The continuous data analyzing unit 2 performs such a process operation for specifying a portion of the continuous data, in which a material distributed to the user is indicated, by way of such a known method from, for example, the non-patent publication 3. Concretely speaking, since this continuous data analyzing unit 2 analyzes a video picture on which conditions of a meeting have been recorded, the continuous data analyzing unit 2 specifies a place where a presentation material is displayed. Then, the continuous data analyzing unit 2 compares a resemblance degree as to picture information of this specified place with a resemblance degree as to image information of the distributed materials which were used in the presentation, so that the continuous data analyzing unit 2 can specify as to when and which material has been used in the presentation (when a plurality of pages are used, which page has been used in presentation).

In this example, in such a case that such picture information is analyzed, the continuous data analyzing unit 2 scans/compares the entire picture frame with the distributed materials, and if there is a portion resembled to the distributed materials at a certain degree higher than a predetermined resemblance degree within the picture frames, then the continuous data analyzing unit 2 may judge that this resembled portion corresponds to an image portion of the distributed materials. Alternatively, the continuous data analyzing unit 2 may extract a material image from picture information so as to compare this extracted material image with an image of the distributed material. In accordance with this latter analysis, the continuous data analyzing unit 2 may judge a matching characteristic between these materials in higher precision.

For example, in the case that a presentation is carried out by using electronic data in a meeting, such an information may be acquired from presentation software. This information indicates that when and which portion contained within which material had been displayed in this meeting. In such a case, necessary information can be obtained by a very simple analyzing process operation, and the continuous data analyzing unit 2 may be omitted in a specific case.

Figures 2A, 2B, 2C, 2D, 2E, 3:
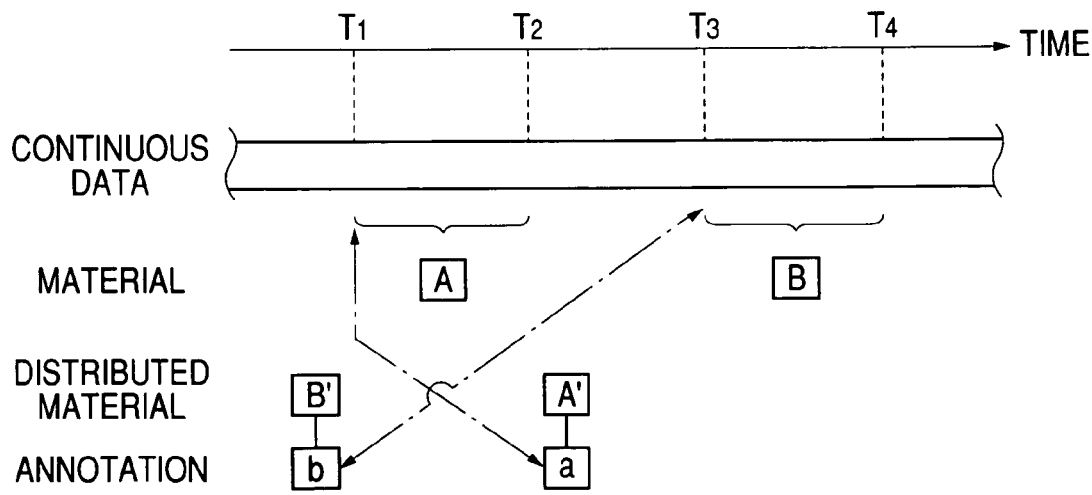
FIGS. 2A to 2E are explanatory diagrams for explaining a data structure according to the embodiment of the present invention.
FIG. 3 is an explanatory diagram for explaining a relationship among continuous data, materials, distributed materials, and annotations.

In summary, if such an information for indicating when and which portion contained within which material had been used can be obtained, then satisfaction can be made. For instance, as shown in FIG. 3, the continuous data analyzing unit 2 may specify such a fact that an image of a material "A" is contained in a place defined between time positions "T1" and "T2" of the continuous data which had recorded the conditions of the meeting, and an image of a material "B" is contained in a place defined between time positions "T3" and "T4" thereof.

The material data supplying unit 3 corresponds to either a memory or a communication interface, which supply materials (having same contents as those of materials used in above-described meeting) which are distributed to a user "P" as a participant of the meeting in the form of electronic data. The output unit 4 corresponds to a display for displaying images of distributed materials which are provided. Also, the input unit 5 corresponds to a keyboard, a mouse, a pen input tablet, and the like. This input unit 5 is used to turn pages of the distributed materials displayed on the output unit 4 by the user P, and/or used to input an annotation in the distributed materials by the user P.

As a consequence, the user P who participates in the meeting may freely input an arbitrary annotation from the input unit 4 with respect to an arbitrary material portion, while the user P turns pages of the distributed materials.

It should be understood that a material "D" which is provided in a printed paper mode may be employed as a material which is distributed to the user P. The user P may write an annotation in such a distributed material D by using a writing tool "S". In this example, in order to accept the above-described alternative operation, the user-data relating apparatus is equipped with the reading unit 6 and the material/annotation extracting unit 7. The reading unit 6 is employed as one mode of a unit for inputting the annotation. The material/annotation extracting unit 7 is employed so as to produce the annotation described by the writing tool S such as a pen in an electronic data form.

The reading unit 6 corresponds to a scanner for reading a distributed material "D" so as to acquire an image thereof. The material/annotation extracting unit 7 extracts the annotation described in this distributed material "D" from the images of the distributed material "D" read by the reading unit 6 as either image data or text data whose character has been recognized/converted.

Now, in the case that materials have been distributed as electronic data, since distributed materials have already been discriminable from each other in the information process operation, it is simple to realize that the annotation data to be added by operating the input unit 5 are held in the distributed materials in the discriminable mode in relation to the distributed materials.

On the other hand, as to the material "D" which is distributed in a printed paper mode, for example, this distributed material itself and the annotation thereof are electronically discriminated from each other by, for example, the below-mentioned manner, so that annotation data can be extracted.

While electronically readable identifier such as a bar code and a glyph is attached to the distributed material "D" and the resultant distributed material "D" is printed, both each of the distributed materials and each of pages contained in the distributed materials may be electronically and exclusively discriminated form each other. Then, while the data as to the original material before the annotation is described are held, since both the distributed materials and the pages contained in the distributed materials can be electronically discriminated from each other, a calculation is made between the distributed material image equipped with the annotation which has been read by the scanner, and the corresponding original image. Then, such an image portion which produces a larger difference than a predetermined difference is extracted as annotation data, and an identifier may be applied to this annotation.

It should be noted that another annotation extracting method may be realized. That is, while an annotation is described in a distributed material by using a pen "S" having a different color from the color of this distributed material, such a material portion described by the color of this pen S is extracted from an image of the distributed material read by a color scanner.

Also, in the case that the user "P" cannot judge in advance such a material which was used in which meeting, differences are calculated between plural distributed materials having annotations which had been read by a scanner and all of original distributed materials. Then, such a distributed material whose difference is a minimum may be discriminated as the material used in the relevant meeting.

An annotation which has been extracted in the above-explained manner maybe related to continuous data as image data. Alternatively, in such a case that this extracted annotation is employed as text data, character data of a described content may be extracted from this image by utilizing the character recognizing technique known in this technical field.

The annotation/material relating unit 8 discriminates the distributed material D whose images have been read from the annotations which have been described in this distributed material D, and then holds the extracted annotation data in the annotation data holding unit 9 in correspondence with the distributed material D. This annotation data holding unit 9 is constructed of such a readable/writable memory.

It should be noted that in this example, the image data of the distributed material D itself is also extracted, and then, this extracted image data is employed in the matching judgement by the material matching unit 10.

The material matching unit 10 judges resemblance degrees between images of a distributed material to which annotations have been given, and material images contained in specified continuous data. Then, the material matching unit 10 judges such a continuous data place whose resemblance degree is larger than, or equal to a predetermined resemblance degree as a position to which this distributed material corresponds (namely, such a portion to which annotation attached to this distributed material should be related).

The relating unit 11 produces such a link information for causing the relevant annotation data to be related to the relevant position contained in the continuous data based upon the following analysis/judgement result. This analysis/judgement result defines that an image of a material is contained at which position within the continuous data, and also, which annotation has been added to a distributed material corresponding to this material.

The correlative relationship holding unit 11 is constituted by a readable/writable memory, and holds the link information produced by the relating unit 11 in correspondence with the continuous data.

The synchronous output unit 13 corresponds to either a display or a speaker, which may provide both continuous data and annotation data linked to this continuous data based upon the continuous data derived from the continuous data holding unit 1, the annotation data supplied from the annotation data holding unit 9, and the link information produced from the correlative relationship holding unit 12 (in a certain case, material data supplied from material data supplying unit 3 is further employed).

Next, a relating process operation according to this example will now be explained in more detail with reference to FIGS. 2A to 2E and FIG. 3.

In the relating process operation of this example, while both continuous data which were recorded in a meeting and annotations which were entered by a participant, i.e., the user "P" in this meeting have been held respectively, the relevant position of the continuous data is caused to be related to the annotation in a post processing operation. Concretely speaking, a holding process operation, an inputting process operation, an image reading process operation, and a relating process operation are carried out in the postprocessing operations. In the holding process operation, annotation data is entered by the user P from the input unit 5, and this entered annotation data is held in the holding unit 9. In the inputting process operation, while the annotation is described in the distributed material "D" by the user by using the pen "S" in real time in the meeting, the recorded continuous data is inputted, and then this inputted continuous data is processed. In the reading process operation, the annotation described in the distributed material D is read out, and then the read image is processed. Also, in the relating process operation, the annotation is related to the continuous data.

First, in the meeting, conditions of this meeting are recorded as continuous data by using a video camera, or the like; the user "P" who participates in this meeting arbitrarily inputs an annotation from the input unit 5 with respect to a desirable distributed material which may be viewed from the output unit 4. Also, the user "P" arbitrarily inputs an annotation by using the writing tool "S" with respect to such a material which has been printed and has been distributed.

It should be understood that as indicated in FIG. 2C, the annotation data (actual data) entered from the input unit 5 is identified by using an annotation number (No.) to be held in the annotation data holding unit 9.

In the postprocessing operation in which the recording operation of the continuous data is accomplished, when this relevant continuous data (actual data) is inputted, as shown in FIG. 2A, this inputted continuous data is stored in the continuous data holding unit 1 by being identified by a continuous data number (No.). In connection with this holding operation, the continuous data analyzing unit 2 specifies both a place containing a material image and this material image by analyzing the inputted continuous data. In other words, as shown in FIG. 2B, the continuous data is identified by the continuous data number (No.) thereof, and the material which is identified by the material number is related to a continuous data portion (position) containing this material.

Concretely speaking, as shown in FIG. 3, both continuous data portions "T1" to "T2" containing the material image "A" and continuous data portions "T3" to "T4" containing the material image "B" are analyzed by the continuous data analyzing unit 2, so that a correspondence relationship among these continuous data portions may be specified.

Also, in this postprocessing operation, such a distributed material "D" in which an annotation has been described on the paper is read by the reading unit 6 so as to extract an annotation portion from this read image (otherwise, material portion and annotation portion are separately extracted from read image), and the annotation data (actual data) is held in the annotation data holding unit 9 by being identified by the annotation number (No.), as represented in FIG. 2C.

The annotation/material relating unit 8 defines the read material in correspondence with the annotation thereof by identifying these material and annotation based upon the respective numbers (Noes.), as shown in FIG. 2D.

Then, while the material matching unit 10 refers to both the analysis result (FIG. 2B) obtained by the continuous data analyzing unit 2 and the correspondence-relating result (FIG. 2D) obtained by the annotation/material relating unit 8, this material matching unit 10 may judge a matching characteristic between the material image contained in the entered continuous data and the image of the distributed material based upon a difference calculation.

Then, in the case that the material image contained in the continuous data is matched with the distributed material image, the relating unit 11 produces link information between the place of this matched continuous data and the annotation corresponding to this matched distributed material, and then, as indicated in FIG. 2E, the relating unit 11 holds this link information in the correlative relationship holding unit 12 in correspondence with the continuous data number.

Concretely speaking, the above-described process operation may be illustratively represented in FIG. 3.

While both an image of a material "A" and an image of a material "B" are contained in continuous data, in such a case that materials having the same contents as those of these materials "A" and "B" have been distributed as a distributed material "A'" and another distributed material "B'" with respect to the user "P", the materials "A" and "B" are used in this order during recording operation of the continuous data (namely, in meeting). Nevertheless, even when the user "P" as the participant views the distributed materials "B'" and "A'" in this order which is opposite to a progress direction of the meeting and also writes annotations "a'" and "b'" into these distributed materials "B'" and "A'" respectively, an identification number of the annotation "a" described in the distributed material "A'" is related to the continuous data positions (T1 to T2) where the material image "A" is matched with the distributed material image "A'", whereas an identification number of the annotation "b" described in the distributed material "B'" is related to continuous data positions (T3 to T4) where the material image "B" is matched to the distributed material image "B'."

As a consequence, the annotations which are described by the user P of the participant in the distributed materials may be related to the places where the relevant materials contained in the continuous data are used irrespective of the progress of this meeting.

It should also be understood that in the example shown in FIG. 3, the linking position of the annotation is selected to the head position of the relevant place within the continuous data. Alternatively, the linking position of the annotation may be selected to be, for example, an intermediate position of the relevant place; a terminal position of the relevant place; and an entire section of the relevant place, namely may be set to various places, if necessary.

Then, when the identification numbers of the annotations described in the distributed materials are related to the continuous data positions in the above-explained manner, for example, both the continuous data and the annotation may be utilized by being reproduced in the synchronous manner. In other words, the synchronous output unit 13 acquires required data from the continuous data holding unit 1, the annotation data holding unit 9, the correlative relationship holding unit 12 (furthermore, material data supplying unit 3, in some cases). Then, this synchronous output unit 13 synchronous-reproduces both the continuous data and the annotation data (further, material data in some cases) to provide the synchronous-reproduced continuous data/annotation data to the user.

In this case, as to the correlative relationship between the continuous data and the annotation data, the continuous data may be caused to be related to the annotation data in a mutual link, or in an one-way link. In the former case, for instance, when a user issues an instruction from the operation unit at a required position of a meeting picture which is reproduced to be displayed on the display screen, the annotation related to this required position is displayed on the screen. Alternatively, when the user instructs to select a desirable annotation from a list of the annotations displayed on the screen, such a related picture portion of the meeting picture is commenced, namely, bidirectional access operation may be carried out.

In the above-described embodiment, the annotation in the text format has been described. Alternatively, an image, reference link information, voice information, and the like, which are entered, or described by a user may be related as user data with respect to the continuous data.

Also, the continuous data may be replaced by speech data. For example, such a speech data may be speech-recognized so as to specify a content of a material used in this speech data. Then, a matching characteristic between this specified content and a content of a distributed material may be defined, and an annotation may be related to the relevant position of continuous data.

As previously described, in accordance with the present invention, based upon the corresponding relationship between the material used while the continuous data is recorded and the material distributed to the user, the user data added with respect to the distributed material is caused to be related to the relevant position of the continuous data. As a consequence, the continuous data can be caused to be related to the static user data such as the annotation which is related to this continuous data in connection with the actual activity of the user.

What is claimed is:

1. A user-data relating apparatus comprising:
   an input unit that allows a user to electronically add user data to a second material which has been electronically distributed to the user in relation to a first material which is used when continuous data is recorded; and
   a relating unit that causes the user data to be related to a corresponding position in the continuous data where the material is used, based upon a corresponding relationship between the second material and the first material.

2. The user-data relating apparatus according to claim 1, further comprising:
   an analyzing unit that specifies (i) which material is used as the first material when the continuous data is recorded and (ii) the corresponding position in the continuous data where the first material is used.

3. The user-data relating apparatus according to claim 1, further comprising:
   a synchronous output unit that synchronizes the continuous data with the user data to reproduce both the continuous data and the user data synchronized with the continuous data based upon the relating information acquired by the relating unit.

4. A user-data relating method comprising:
   allowing a user to electronically add user data to a second material which has been electronically distributed to the user in relation to a first material which is actually used when continuous data is recorded; and
   causing the user data to be related to a corresponding position in the continuous data in which the first material is used, based upon a corresponding relationship between the second material and the first material.

5. The method according to claim 4, further comprising:
   specifying (i) which material is used as the first material when the continuous data is recorded and (ii) the corresponding position in the continuous data where the first material is used.

6. The method according to claim 4, further comprising:
   synchronizing the continuous data with the user data to reproduce both the continuous data and the user data synchronized with the continuous data based upon the relating information acquired by the relating unit.

7. A user-data relating method comprising:
   extracting (i) user data which is written by a user into a second material distributed to the user in relation to a first material which is used when continuous data is recorded and (ii) an electronically readable identifier assigned to the second material, by reading an image of a printed material; and
   causing the user data to be related to a corresponding position in the continuous data where the first material is used, based upon (i) the extracted electronically readable identifier and (ii) a corresponding relationship between the second material and the first material.

8. The method according to claim 7, wherein the electronically readable identifier is one selected from the group consisting of a bar code and a glyph.

9. A user-data relating apparatus comprising:
   a reading unit that reads an image of a second material which is distributed to a user;
   an extraction unit that extracts (i) user data which is written by a user into the second material in relation to a first material which is used when continuous data is recorded and (ii) an electronically readable identifier assigned to the second material; and
   a relating unit that causes the extracted user data to be related to a corresponding position in the continuous data where the first material is used, based upon (i) the extracted electronically readable identifier and (ii) a correspondence relation between the first material and the second material.

* * * * *